United States Patent [19]

Pradel et al.

[11] 4,404,102
[45] Sep. 13, 1983

[54] FILTRATION APPARATUS FOR FLAT FILTER PLATES CUT TO SIZE

[75] Inventors: Günter Pradel; Ulrich Quaschning, both of Göttingen, Fed. Rep. of Germany

[73] Assignee: Sartorius GmbH, Fed. Rep. of Germany

[21] Appl. No.: 344,506

[22] Filed: Feb. 1, 1982

[30] Foreign Application Priority Data

Jan. 31, 1981 [DE] Fed. Rep. of Germany ... 8102504[U]

[51] Int. Cl.³ ............................................. B01D 35/02
[52] U.S. Cl. .................................... 210/247; 210/411; 210/450
[58] Field of Search ............... 210/445, 450, 247, 446, 210/411

[56] References Cited

U.S. PATENT DOCUMENTS

3,085,689 4/1963 Hering et al. .................. 210/445 X
3,556,302 1/1971 Agranat ......................... 210/450 X
4,263,140 4/1981 Wutnovich et al. ............... 210/247

Primary Examiner—Frank A. Spear, Jr.
Attorney, Agent, or Firm—Eric P. Schellin

[57] ABSTRACT

The invention relates to a filtration apparatus with an upper casing part and a base part, each provided with a fluid chamber and an inlet or outlet respectively, for holding a flat filter plate cut to size which is enclosed between a permeable filter support associated with at least one casing part, and the other casing part, in which structure the two casing parts with inclusion of the flat filter plate cut to size are in the edge area sealed against each other in a leakproof manner and are connected by detachable tightening means.

13 Claims, 6 Drawing Figures

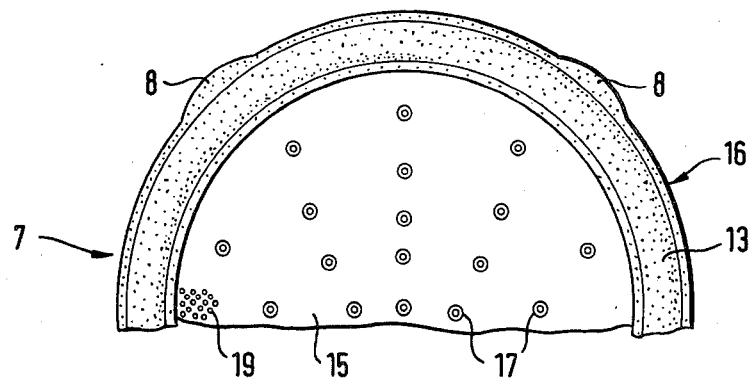
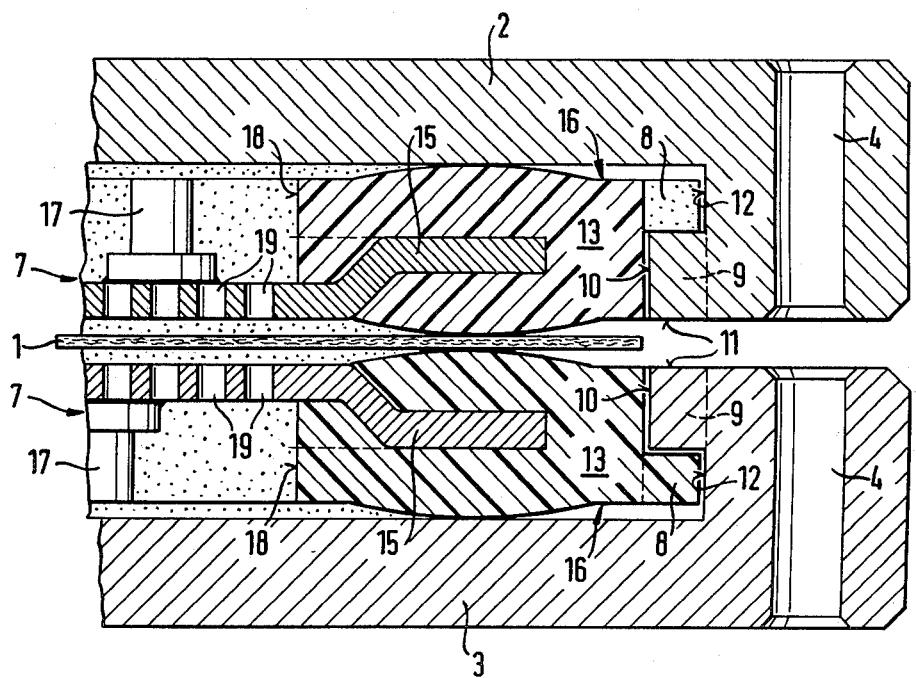

FILTRATION APPARATUS FOR FLAT FILTER PLATES CUT TO SIZE

BACKGROUND OF THE INVENTION

Filtration devices are known, e.g., from U.S. Pat. No. 1,475,572, DE-GM No. 75 11 229, DE-GM No. 80 19 310, and DE-OS No. 28 25 411. The removable casing upper part usually forms the inlet side in this structure, while the casing base part, usually provided with support legs, forms the outlet side. The base part of the filter support is accordingly formed by a grid, wire netting, or a perforated plate which forms the permeate chamber leading into the outlet. According to U.S. Pat. No. 3,031,082, the casing upper part is at its inside provided with support ribs which support the flat filter plate cut to size to prevent against a possible backwash from the outlet side. Such a support by ribs is sufficient when pressures from the backwash are low, or it may be entirely unnecessary when no backwash at all occurs. When high pressures occur, at the inlet side as well as from possible back wash, in more recent filtration devices (DE-GN No. 80 19 310) the casing upper part as well as base part are provided with the same filter support, so that damages to the membrane or flat filter plate cut to size on the basis of mechanical stress are impossible. The filter support in such devices consists usually of a perforated metal sheet which enters into a direct contact with the flat filter plate cut to size, and of a perforated metal sheet reinforcement arranged on the side of the perforated sheet facing away from the membrane, which reinforcement together with its hollow spaces forms the inlet-side or outlet-side fluid chamber. In the known devices, the entire filter support is positioned in a gradual recess of the casing parts. The handling of the casing upper part in such a structure is especially unsatisfactory since the filter support, after the placing of the flat filter plate cut to size upon the casing base part, must be held in place manually until the casing upper part is applied to the casing base part so as to cover it and with the aid of the tightening means the connection of the two casing parts can be established. Due to the need for handling, there is also the disadvantage that in the sterile filtration device the casing parts emerging from the autoclave, especially the upper part, might become non-sterile again unless the utmost care is applied in the feeding and in the construction.

To be sure, it is known (DE-OS No. 26 45 111) to support a backwash sieve arranged in the casing upper part by means of an elastic O-ring which rests in an outer closing edge of the backwash sieve and engages at various places protruding projections on the inside edge of the cover part in a detachable manner. This construction is, however, very expensive and is separate from the casing seal.

A further disadvantage of the known filtration devices consists in that the edge sealing is carried out by means of rotary O-ring seals arranged in at least one casing part, e.g., of silicone rubber, which after repeated autoclaving becomes brittle and shrinks, thus producing the danger of leaks.

BRIEF SUMMARY OF THE INVENTION

The invention is therefore based on the need for improving with simple means filtration devices of the structure initially described in such a way that the handling, the structure, the feeding thereof, and the sealing of the casing parts against each other is facilitated.

This task is accomplished by the invention in that the filter support formed as a perforated circular disc rests in a circular recess of the associated casing part, and the recess and the edge of the filter support have edge sections formed as projections and recesses which correspond with each other, and that the structural part provided with the recess is shaped, in its adjacent edge area, as a groove which is engaged by the projections of the other structural element by a turning of the filter support, whereby the filter support is coupled with the associated casing part, in which structure at least two approximately opposite projections are distributed over the periphery of the casing part.

In this manner it is possible to fix the filter support to the casing part before its insertion into the autoclave, so that after the sterilization of the casing parts and the filter supports only the also sterile flat filter plate cut to size must be placed upon the base element. The edge of the filter support is formed preferably as an elastic circumferential seal which replaces the otherwise customary O-ring seals.

BRIEF DESCRIPTION OF THE DRAWINGS

FIG. 2 illustrates a view of the filter support from the support pin side;

FIG. 4 illustrates a detailed view of a vertical section through the edge area of a compound filtration apparatus without a tightening of the casing parts having been carried out;

DETAILED DESCRIPTION OF THE INVENTION

Figure 1:
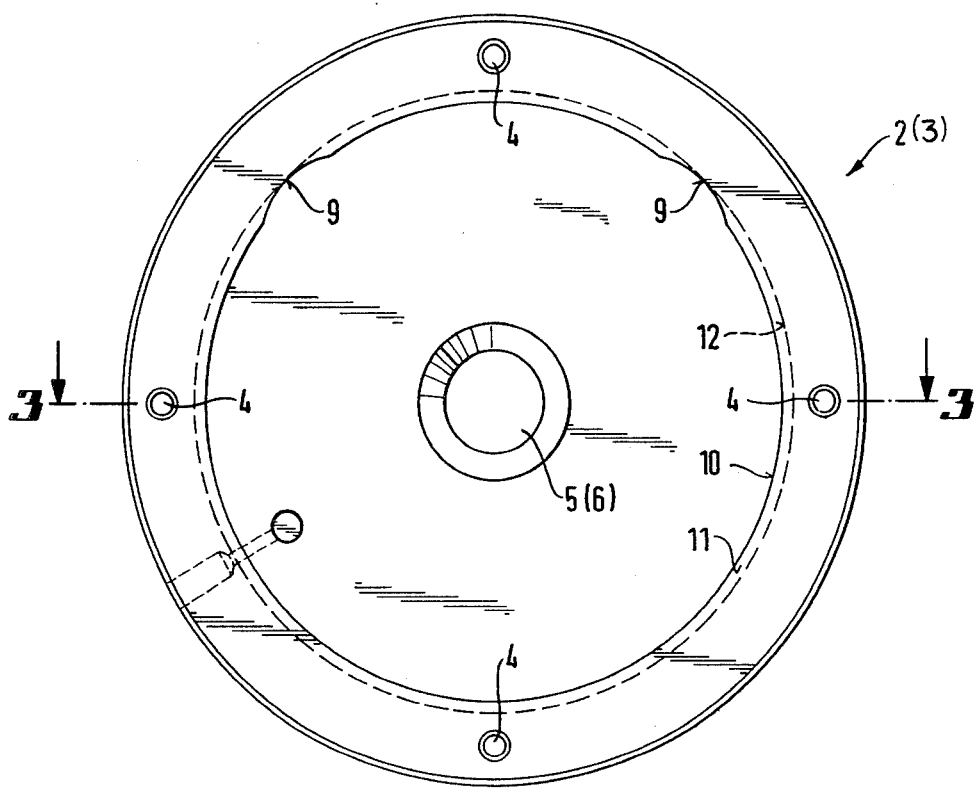
FIG. 1 illustrates a view from below of the casing upper part.
Figure 3:
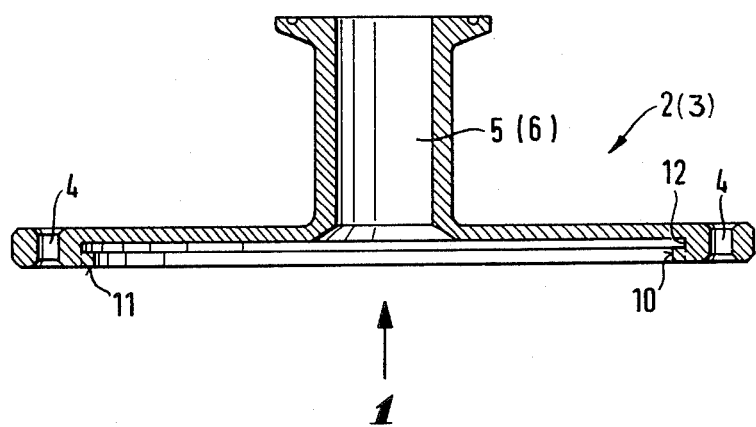
FIG. 3 illustrates a vertical section through the casing upper part along line 3—3 in FIG. 1.

As shown in FIG. 1 the filtration apparatus consists essentially of a casing upper part 2 with an inlet 5, and a casing base part 3 similarly constructed, with outlet 6. With each casing part 2, 3, as shown in FIGS. 2 and 4, a filter support 7 is associated which encloses the flat filter plate 1 in a sandwich-like manner.

According to the invention, each circular casing part 2, 3 is provided, as shown in FIG. 4, in the area of the casing inside edge 11, with a annular recess 10 in which the filter support 7 sits. According to the invention, recess 10 is undercut for the formation of a groove 12 forming mating means and is provided according to FIG. 1 with at least two indentations 9 arranged at an angular distance of 120° radially on the recess. The outside edge of filter support 7 has, according to FIG. 2, three projections 8 protruding at an angular distance of 120° radially, which in form and size correspond with the recesses 9 of groove 12 and form radially arranged fastening means. According to FIG. 2, only two projections 8 are shown. The filter support 7 can simply be inserted into the recess 10 by the device of inserting the third projection (not shown) at first radially into the groove 12 so that the two other projections 8 correspond with the two recesses 9 in groove 10. A small turn of the filter disc 7 makes projections 8 engage groove 12, whereby filter disc 7 is coupled with the associated casing part 2 or 3. It is therefore assured that the connected filter support 7 cannot drop out of recess 10. Handling is thereby substantially facilitated.

Figure 5:
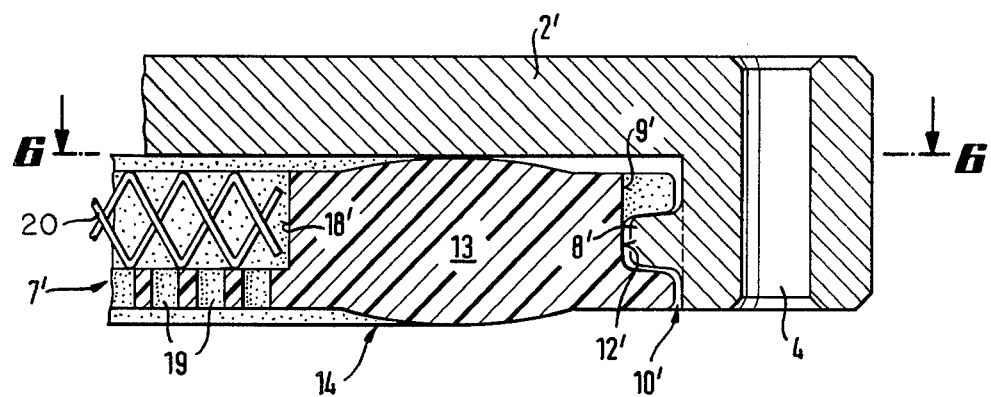
FIG. 5 illustrates a modification of the filter support as shown in FIGS. 2 and 4 in a view along the cutting line 5—5 in FIG. 6.
Figure 6:
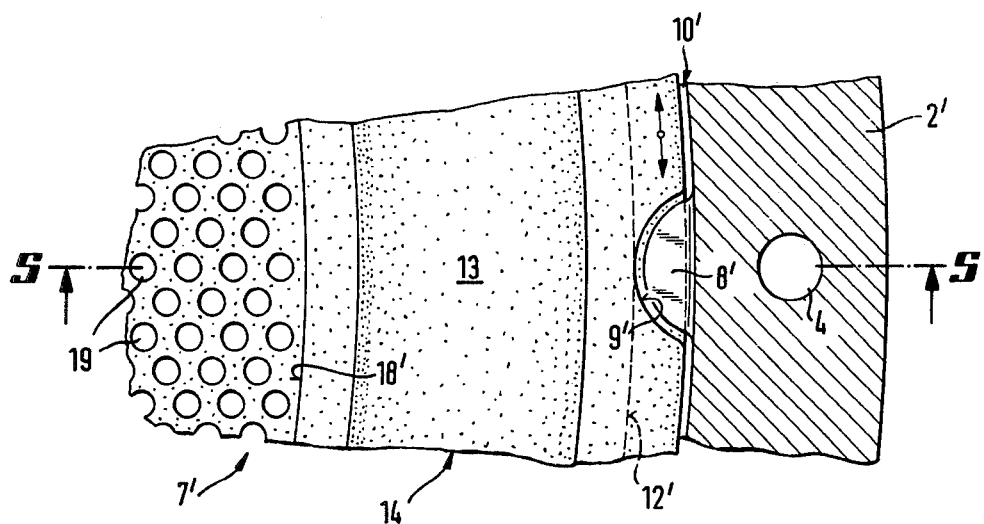
FIG. 6 illustrates a horizontal section through the embodiment according to FIG. 5 along line 6—6.

Analogously, the arrangement of the projections and recesses can be reversed relative to the casing and filter support as shown in FIGS. 5 and 6. Corresponding structural parts are indicated in these two figures by analogous reference symbols to those of FIGS. 2 and 4. Accordingly, projections 8' are arranged forming mating means for in casing part 2' or in recess 10' respectively, while indentations 9' are arranged in groove 12' forming fastening means for of filter support 7'.

The problem of the sealing of the two casing parts 2, 3 is solved in the invention by forming the edge area of the filter support 7, 7' as a molded plastic material part with sealing function. In the embodiment of FIG. 4, the filter support 7 consists of a perforated plate 15 with a multiplicity of perforations 19 shown only partially in FIG. 2, and the perforated plate 15 enters into contact with flat filter plate 1. The perforated metal sheet 15 bent off at the edge is enveloped by injection of a plastic material, preferably PFA or PTFE, into a U-shaped mold, whose legs are of spherical or convex cross section as viewed in a vertical plane and thus a circumferential seal as shown in FIG. 2 is formed. The circumferential seal effectively forms a seal with the casing parts 2 or 3 as well as the membrane element 1. The projections 8 are in this structure molded in one piece to a molded plastic material part 16 as shown in FIG. 2. Perforated plate 15 usually involves a very thin sheet metal whose perforations 19 are produced by the photo etching process. For the further stabilization of the relatively thin perforated plate 15, a multiplicity of support pins 17 is spot welded on the side facing away from the flat filter plate 1. The metal parts of perforated plate 15 are provided with a coating of PTFE.

In place of the welded-on support pins 17 shown in FIG. 4 the support and stabilization of perforated plate 15 may also take place by means of projecting members, such as knobs, bridges or ribs, which may be provided on the inside of the associated casing parts 2 or 3. These elements, however, render the manufacture of the casing parts 2 and 3 more difficult and expensive.

Since these support pins 17 are in turn supported on the inside of the casing they form a kind of distribution chamber and serve to stabilize the thin perforated plate 15. The free space for these support pins 17 is formed by the raised inside edge 18 of one leg of the molded plastic material part 16.

As shown in FIG. 1, several clamp handle holes 4 are distributed over the periphery of the casing, in which holes or bolts are inserted, whereby the two casing parts 2, 3 can be so tightly clamped together that the fluid (liquid or gas) to be filtered can flow through the cut to size flat filter plate 1 only.

In the embodiment of FIGS. 5 and 6, filter support 7' consists of a one-piece molded plastic material part made e.g., of PFA or PTFE. Instead of using a reinforcement 20 as shown in FIG. 5, it is of course also possible to originally provide the filter support 7' with sufficient material strength and stiffness, or to make the support pins 17 shown in FIG. 4 an integral part of filter support 7' which is made of plastic material.

The filter support 7 or 7' according to the invention need not necessarily be arranged in the casing parts 2, 3, respectively. Other combinations with conventional filter supports are likewise possible. In place of a perforated sheet 15, e.g., a metal grid or metal gauze may be employed which is directly connected as a multispot support for flat filter plate 1 and in the edge area is enclosed by the molded plastic material part 16. All metal parts, insofar as they are not coated with plastic material, are usually made of refined steel in such filtration devices. The concept of the invention, however, does not exclude a structure wherein the casing parts might consist also of a suitable plastic material.

SUMMARY OF THE INVENTION

The filtration apparatus of flat structure for holding a flat filter plate (1) cut to size consists of a casing upper part (2) and a base part (3) with an inlet (5) and an outlet (6) and is provided in each casing part with a filter support (7, 7') which can be connected, by means of projections (8, 8') engaging a rotary groove (12, 12'), with the associated casing part (2, 3), respectively. The edge of the circular filter support (7, 9') is also constructed as a molded circumferential seal (13) with respect to the associated casing part (2 or 3) and to the flat filter plate (1). The circumferential seal (13) is part of a molded plastic material part (16) which is also provided with radially protruding projections (8) which correspond with correspondingly formed recesses (10) of an undercut or a groove (12) of the associated casing part (2, 3) and a slight turning of the filter support (7, 7') couples the latter with the associated casing part 2 or 3 (FIG. 4).

What is claimed is:
1. Filtration apparatus for holding a flat filter plate comprising:
   (a) a casing comprising an upper part with an inlet and a fluid chamber, and a base part with an outlet and a further fluid chamber;
   (b) each casing part having a permeable filter support which delimits the fluid chamber for the fluid, in which structure the flat filter plate can be inserted in a sandwich-like manner between the opposite surfaces of the filter supports of the two casing parts;
   (c) both fluid chambers with inclusion of the flat filter plate being sealed against each other in a leakproof manner by at least one circumferential seal arranged in the area of the periphery of the casing parts, and both casing parts being tightened in sealing manner by detachable tightening means;
   (d) the filter support being provided in the form of a disc with circular perforation;
   (e) the circumferential seal being provided at its peripheral edge with several radially arranged fastening means.
   (f) the casing part being provided at the periphery of the fluid chamber holding the filter support with mating means corresponding to the radially arranged fasten means of the filter support;
   (g) the corresponding radially arranged fastening means and mating means engage one another to join the filter support and the casing part axially and radially.
2. Filtration apparatus as in claim 1, wherein the radially arranged fastening means comprises protruding projections of the filter support and the mating means comprises grooves in the casing.
3. Filtration apparatus as in claim 2 wherein the grooves in the casing are provided with adjacent indentations, the grooves in the casing are arranged in the fluid chamber of the casing, and the protruding projec- tions of the filter support are arranged on the outer edge of the filter support.

4. Filtration apparatus as in claim 1, wherein the edge of the filter support that engages the fluid chamber of the casing is shaped as an elastic circumferential seal which covers at least partially an inner edge of the adjacent casing.

5. Filtration apparatus as in claim 3 wherein at least two of the protruding projections of the filter support and at least two indentations of the grooves in the casing are arranged at an angular position of 120 degrees on the periphery of the filter support and the inner casing edge, respectively.

6. Filtration apparatus as in claim 1 wherein the radially arranged fastening means comprises grooves in the filter support and the mating means commprises protruding projections of the casing.

7. Filtration apparatus as in claim 6 wherein grooves in the filter support are provided with adjacent indentations, the grooves in the filter support are arranged in the outer edge of the filter support, and the protruding projections of the casing are arranged in the fluid chamber of the casing.

8. Filtration apparatus as in claim 7 wherein at least two of the protruding projections of the casing and at least two indentations of the grooves in the filter support are arranged at an angular position of 120 degrees on the periphery of the casing and filter support, respectively.

9. Filtration apparatus as in claim 1, wherein the filter support comprises a perforated metal plate whose edge area is enclosed by an injection-molded plastic element, the plastic element being sealable to the casing.

10. Filtration apparatus as in claim 9, wherein the circumferential seal is formed by the injection molded plastic element which embraces the edge of the perforated metal plate and is U-shaped.

11. Filtration apparatus as in claim 10, wherein the cross section of the U-shaped plastic element is spherical as viewed in a vertical plane.

12. Filtration apparatus as in claim 1, wherein the filter support comprises a perforated metal sheet, U-shaped molded plastic element embracing the edge of the perforated metal sheet, the U-shaped molded plastic element has a plurality of support pins connected therewith for stabilizing the perforated metal sheet, the support pins rest on the side of the perforated metal sheet which faces the casing, and is seated in the free space formed by the raised inside edge of the molded plastic element whereby the filter support is sealed to the casing.

13. Filtration apparatus as in claim 11 wherein the metal perforated sheet is bent at the edge, about its middle, and fits into the circumferential seal of the plastic material around it.

* * * * *